US008851787B2

(12) United States Patent
Kelley et al.

(10) Patent No.: US 8,851,787 B2
(45) Date of Patent: Oct. 7, 2014

(54) CORNER JOINT AND METHOD OF MANUFACTURING

(75) Inventors: Timothy Kelley, Stillwater, MN (US); Katrina Brandstrom, Hudson, WI (US); Troy Fox, Hudson, WI (US); Bryan Kendall, River Falls, WI (US); Gerard Lagos, St. Paul, MN (US)

(73) Assignee: Andersen Corporation, Bayport, MN (US)

( * ) Notice: Subject to any disclaimer, the term of this patent is extended or adjusted under 35 U.S.C. 154(b) by 92 days.

(21) Appl. No.: 13/215,586

(22) Filed: Aug. 23, 2011

(65) Prior Publication Data

US 2013/0051902 A1    Feb. 28, 2013

(51) Int. Cl.

| | |
|---|---|
| *F16B 7/00* | (2006.01) |
| *B29C 65/00* | (2006.01) |
| *B29C 65/54* | (2006.01) |
| *E06B 3/968* | (2006.01) |
| *F16B 12/46* | (2006.01) |
| *E06B 3/96* | (2006.01) |
| *B29C 65/50* | (2006.01) |
| *B29C 65/60* | (2006.01) |
| *B29C 65/48* | (2006.01) |
| *B29C 65/08* | (2006.01) |
| *B29C 65/56* | (2006.01) |
| *B29L 12/00* | (2006.01) |
| *B29C 65/06* | (2006.01) |
| *B29C 65/02* | (2006.01) |
| *B29L 31/00* | (2006.01) |

(52) U.S. Cl.
CPC .............. *B29C 65/542* (2013.01); *B29C 65/50* (2013.01); *B29C 65/601* (2013.01); *B29C 66/636* (2013.01); *B29C 65/4825* (2013.01); *E06B 3/9682* (2013.01); *B29C 66/1142* (2013.01); *B29C 65/08* (2013.01); *B29C 65/5042* (2013.01); *B29C 66/721* (2013.01); *B29C 65/562* (2013.01); *B29L 2012/00* (2013.01); *B29C 65/06* (2013.01); *B29C 65/483* (2013.01); *B29C 65/4815* (2013.01); *B29C 65/02* (2013.01); *B29C 66/52431* (2013.01); *F16B 12/46* (2013.01); *B29L 2031/005* (2013.01); *B29C 66/1162* (2013.01); *E06B 3/9628* (2013.01)
USPC ........... 403/402; 403/205; 403/295; 52/656.7

(58) Field of Classification Search
USPC ................. 403/292, 295, 205, 401, 402, 403; 52/656.1, 656.2, 656.7, 656.9
See application file for complete search history.

(56) References Cited

U.S. PATENT DOCUMENTS

| | | | | |
|---|---|---|---|---|
| 3,081,852 | A | * | 3/1963 | Mendelsohn ................ 52/656.7 |
| 4,747,248 | A | * | 5/1988 | Fahs .............................. 403/401 |
| 5,585,155 | A | | 12/1996 | Heikkila et al. |
| 5,603,585 | A | | 2/1997 | Bruchu et al. |
| 6,067,760 | A | | 5/2000 | Nowell |

(Continued)

FOREIGN PATENT DOCUMENTS

| | | | |
|---|---|---|---|
| CA | 2 461 802 A1 | | 1/2005 |
| DE | 31 25 042 | * | 5/1983 |

*Primary Examiner* — Michael P Ferguson
(74) *Attorney, Agent, or Firm* — Mueting, Raasch & Gebhardt, P.A.

(57) ABSTRACT

Corner joints and methods of forming corner joints. The corner joints may provide the appearance of a mortise and tenon joint on both the exterior and interior surfaces of the corner joint, but include a mitered connection within the joint. Structures including at least one of the corner joints are also described.

24 Claims, 9 Drawing Sheets

(56) References Cited

U.S. PATENT DOCUMENTS

| | | |
|---|---|---|
| 6,106,944 A | 8/2000 | Heikkila et al. |
| 6,210,792 B1 | 4/2001 | Seethamraju et al. |
| 6,260,251 B1 | 7/2001 | Guhl |
| 6,280,667 B1 | 8/2001 | Koenig et al. |
| 6,342,172 B1 | 1/2002 | Finley |
| 6,746,175 B1 * | 6/2004 | Gonnerman et al. ......... 403/403 |
| 7,634,880 B2 * | 12/2009 | Sironko et al. .................. 52/456 |
| 7,937,904 B2 | 5/2011 | Davies |
| 2010/0202827 A1 * | 8/2010 | Frey .............................. 403/402 |
| 2011/0171434 A1 | 7/2011 | Rubenzer et al. |

* cited by examiner

CORNER JOINT AND METHOD OF MANUFACTURING

Corner joints and methods of forming such joints are described herein.

The structures used to join framing components in a variety of structures such as, e.g., window sashes, window frames, doors, door frames, picture frames, etc. may take a variety of different forms. In some instances, such as, e.g., windows or doors, corner joints may be formed by thermal welding of frame members at each corner. Examples of such a method are described in, e.g., U.S. Pat. No. 5,603,585. In the corner joints disclosed in that reference, the decorative appearance of one side of the corner joint is improved because one of the frame member includes a flange that gives the finished joint the appearance of a mortise and tenon joint structure because the visible joint between the frame members meeting at the corner joint is aligned along the longitudinal axis of one of the frame members.

Although the use of thermal welding to form the corner joints in U.S. Pat. No. 5,603,585 produces joints that are structurally sound and, from one side, have a visually pleasing appearance, thermally welded joints are not without difficulties in the manufacturing process.

SUMMARY

Corner joints and methods of forming such joints are described herein. The corner joints preferably provide the external appearance of a mortise and tenon joint on both the exterior and interior surfaces of the corner joint, but include a mitered connection within the joint. The mitered connection simplifies construction of the joint, while flanges that surround at least a part of the mitered joint on both the interior and exterior surfaces preferably provide a mortise and tenon appearance to the finished corner joint.

In one aspect, corner joints as described herein may include, in some embodiments: a first frame member comprising a first corner end, wherein the first corner end comprises a first mitered surface located between an inner squared flange and an outer squared flange; and a second frame member comprising a second corner end, wherein the second corner end comprises a second mitered surface, an inner edge spaced inwardly from the second mitered surface, and an outer edge spaced inwardly from the second mitered surface, wherein the inner edge and the outer edge are oriented perpendicular to a longitudinal axis of the second frame member. The first mitered surface faces the second mitered surface, a free edge of the inner squared flange on the first frame member faces the inner edge of the second frame member, and a free edge of the outer squared flange on the first frame member faces the outer edge of the second frame member.

In some embodiments of the corner joints described herein the first frame member comprises a first corner end opening, wherein the second frame member comprises a second corner end opening, and the corner joint further comprises a corner key comprising a first leg and a second leg, wherein the first leg is located in the first corner end opening and the second leg is located in the second corner end opening. In some embodiments, the corner joint comprises adhesive material located between the inner squared flange and the corner key and adhesive material located between the outer squared flange and the corner key.

In some embodiments of the corner joints described herein the corner joint comprises an adhesive injection port, wherein the adhesive injection port extends through a wall of the first frame member into an interior volume of the first frame member and/or through a wall of the second frame member into an interior volume of the second frame member. In some embodiments, the adhesive injection port is aligned with an adhesive orifice formed through a corner key located within the corner joint, wherein adhesive material introduced through the adhesive injection port passes through the adhesive orifice before being distributed between the corner key and an interior surface of the frame member. In some embodiments, the corner key comprises a via connected to the adhesive orifice by a channel formed in a first surface of the corner key, wherein adhesive material passing through the adhesive orifice flows into the channel and through the via to a second surface of the corner key. In some embodiments, the adhesive injection port extends through two walls of the frame member, and wherein the adhesive injection port is aligned with an adhesive orifice formed through a corner key located within the corner joint, wherein adhesive material introduced through the adhesive injection port passes through the adhesive orifice before being distributed between the corner key and an interior surface of the frame member.

In some embodiments of the corner joints described herein an inner surface of the outer squared flange is adhesively attached to the second frame member.

In some embodiments of the corner joints described herein an inner surface of the inner squared flange is adhesively attached to the second frame member.

In some embodiments of the corner joints described herein an inner surface of the outer squared flange is adhesively attached to a corner key located within the corner joint, and the corner key comprises a dam positioned beneath the free edge of the outer squared flange such that adhesive is not located between the free edge of the outer squared flange and the corner key.

In another aspect, corner joints as described herein may include, in some embodiments, a first frame member comprising a first corner end that comprises a first corner end opening, wherein the first corner end further comprises a first mitered surface located between an inner squared flange and an outer squared flange; a second frame member comprising a second corner end that comprises a second corner end opening, wherein the second corner end further comprises a second mitered surface, an inner edge spaced inwardly from the second mitered surface, and an outer edge spaced inwardly from the second mitered surface, wherein the inner edge and the outer edge are oriented perpendicular to a longitudinal axis of the second frame member; a corner key comprising a first leg and a second leg, wherein the first leg is located in the first corner end opening and the second leg is located in the second corner end opening; and adhesive material located between the inner squared flange and the corner key and adhesive material located between the outer squared flange and the corner key. The first mitered surface faces the second mitered surface, a free edge of the inner squared flange on the first frame member faces the inner edge of the second frame member, and a free edge of the outer squared flange on the first frame member faces the outer edge of the second frame member.

In another aspect, methods of forming a corner joint as described herein may include, in some embodiments, forming a first mitered surface on a first corner end of a first frame member, wherein the first mitered surface is located between an inner squared flange and an outer squared flange at the first corner end of the first frame member; forming a second mitered surface on a second corner end of the second frame member; forming an inner edge spaced inwardly from the second mitered surface and an outer edge spaced inwardly from the second mitered surface, wherein the inner edge and the outer edge are oriented perpendicular to a longitudinal axis of the second frame member, and wherein the second mitered surface is located between the inner edge and the outer edge; and attaching the first frame member to the second frame member such that the first mitered surface of the first frame member and the second mitered surface of the second frame member face each other within the corner joint, a free edge of the inner squared flange on the first frame member abuts the inner edge of the second frame member, and a free edge of the outer squared flange on the first frame member abuts the outer edge of the second frame member.

In some embodiments of the methods of forming corner joints as described herein, the method may include positioning a first leg of a corner key in a first corner opening of a first corner end of a first frame member and positioning a second leg of the corner key in a second corner opening of a second corner end of a second frame member. In some embodiments, the method further comprises providing adhesive material between the inner squared flange and the corner key and between the outer squared flange and the corner key.

In some embodiments of the methods of forming corner joints as described herein the method may further include injecting adhesive material into the corner joint through an adhesive injection port extending through a wall of the first frame member into an interior volume of the first frame member and/or through a wall of the second frame member into an interior volume of the second frame member. In some embodiments, the adhesive injection port is aligned with an adhesive orifice formed through a corner key located within the corner joint, wherein the adhesive material injected through the adhesive injection port passes through the adhesive orifice before being distributed between the corner key and an interior surface of the frame member. In some embodiments, the corner key comprises a via connected to the adhesive orifice by a channel formed in a first surface of the corner key, wherein the adhesive material injected through the adhesive orifice flows into the channel and through the via to a second surface of the corner key.

In some embodiments of the methods of forming corner joints as described herein using a corner key and an adhesive injection port, the adhesive injection port extends through two walls of the frame member, and wherein the adhesive injection port is aligned with an adhesive orifice formed through a corner key located within the corner joint, wherein the adhesive material injected through the adhesive orifice passes through the two walls of the frame member before being distributed between the corner key and an interior surface of the frame member. In some embodiments, the adhesive material is injected through an injector that is inserted through the two walls of the frame member until the injector is in contact with the corner key at the adhesive orifice.

In some embodiments of the methods of forming corner joints as described herein, an inner surface of the outer squared flange is adhesively attached to the second frame member.

In some embodiments of the methods of forming corner joints as described herein, an inner surface of the inner squared flange is adhesively attached to the second frame member.

In some embodiments of the methods of forming corner joints as described herein, an inner surface of the outer squared flange is adhesively attached to a corner key located within the corner joint, and wherein the corner key comprises a dam positioned beneath the free edge of the outer squared flange such that adhesive material does not flow between the free edge of the outer squared flange and the corner key.

In another aspect, a structure comprising a first frame member and a second frame member attached to each other at a corner joint as described herein may be provided. In such a structure, the corner joint may include a first mitered surface located between an inner squared flange and an outer squared flange on a first corner end of the first frame member; and a second mitered surface located on a second corner end of the second frame member, an inner edge spaced inwardly from the second mitered surface on the second corner end of the second frame member, and an outer edge spaced inwardly from the second mitered surface on the second corner end of the second frame member, wherein the inner edge and the outer edge are oriented perpendicular to a longitudinal axis of the second frame member. In the corner joint, the first mitered surface faces the second mitered surface, a free edge of the inner squared flange on the first frame member faces the inner edge of the second frame member, and a free edge of the outer squared flange on the first frame member faces the outer edge of the second frame member.

In some embodiments of the structure described above, the structure may be selected from the group consisting of a window sash, window frame, door, door frame, and picture frame.

The above summary is not intended to describe each embodiment or every implementation of the corner joints described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Each of the corner joints described herein includes a pair of frame members that meet at a corner in which the frame members are typically, but not necessarily arranged to foam a right angle. Within the corner joint, both of the frame members preferably include a mitered surface that, in a corner joint formed at a right angle, is typically at a 45 degree angle to the longitudinal axis of the frame member. Although the corner joints described herein may be formed at right angles with mitered surfaces at a 45 degree angle, in some embodiments, the corner joints described herein may be used to connect frame members that do not meet at a right angle and the angle of the mitered surfaces relative to the longitudinal axes of the frame members may be adjusted accordingly (although it may be preferred that, in some embodiments, the mitered surfaces bisect the angle formed by the frame members).

In the corner joints described herein, one of the frame members preferably includes an inner flange and an outer flange, with the mitered surfaces being located between and at least partially obscured by the flanges on both the interior and the exterior surfaces of the corner joint. It may be preferred that at least one of the flanges be large enough to completely obscure the mitered surfaces on at least one of the exterior and interior surfaces of the corner joint.

The frame members attached at the corner joints described herein may be fastened together by any suitable technique or combination of techniques. Examples of some potentially suitable techniques may include threaded fasteners (e.g., screws, etc.), pins, rivets, adhesives, welding (thermal and/or chemical), etc. It may be preferred that, regardless of the fastening technique or techniques used, the appearance of the mortise and tenon joint provided by the combination of mitered surfaces located between the flanges be preserved on the visible exterior and interior surfaces of the corner joints.

In some embodiments, the corner joints described herein may include a corner key that fits within the ends of each of the frame members to assist with fastening the frame members together. As described herein, the corner key may preferably be an internal corner key, i.e., a corner key that is not visible from the exterior of the finished corner joint.

Figure 1:
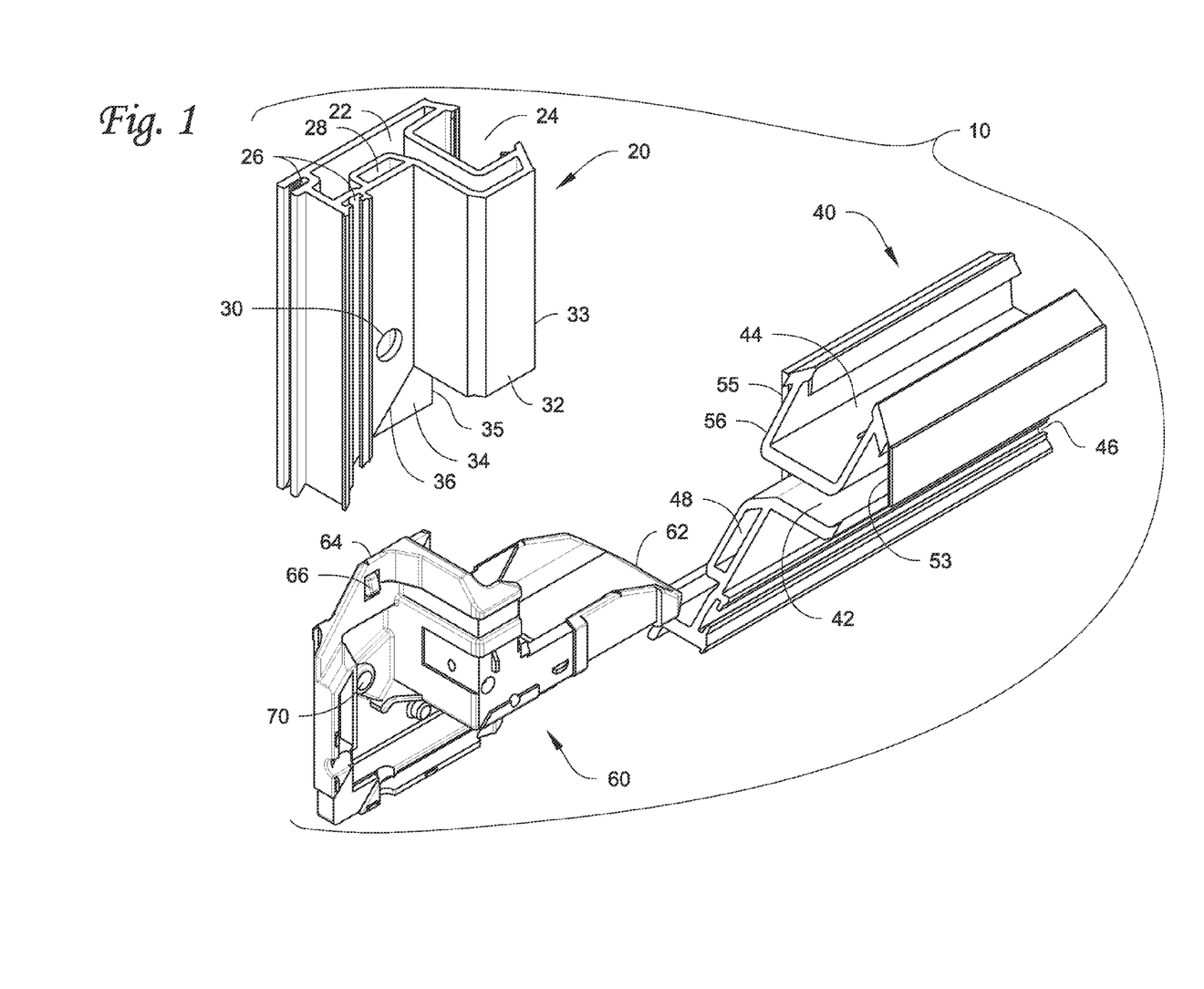
FIG. 1 is an exploded perspective view of one embodiment of a corner joint as described herein.
Figure 2:
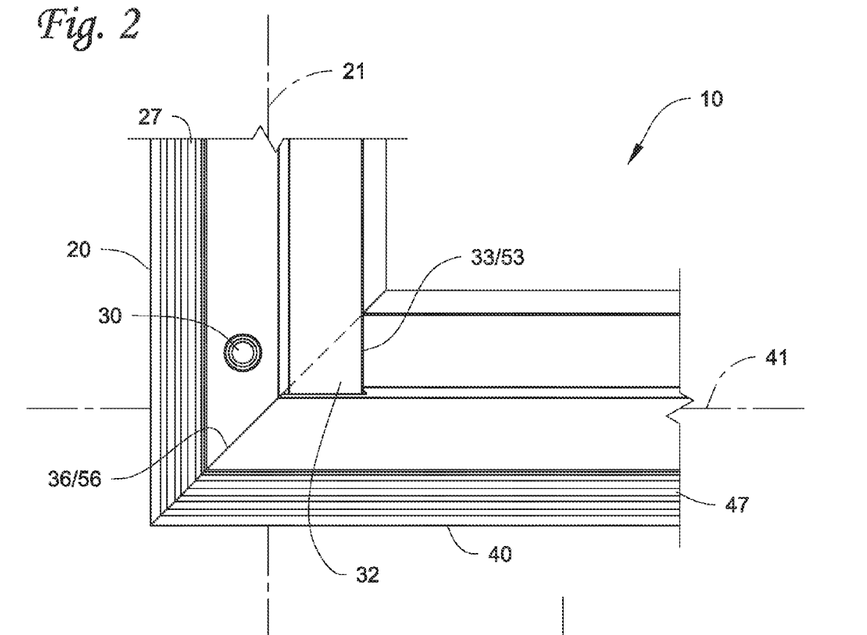
FIG. 2 is an interior side view of the corner joint of FIG. 1 as assembled.
Figure 3:
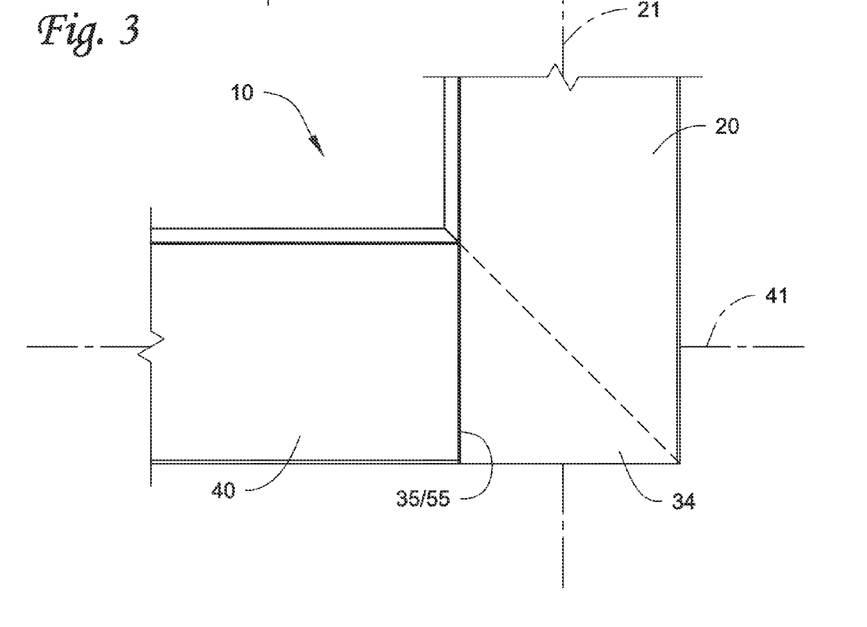
FIG. 3 is an exterior side view of the corner joint of FIG. 1 as assembled.

One illustrative embodiment of a corner joint as described herein is depicted in the exploded view of FIG. 1. As seen there, the corner joints 10 includes a first frame member 20, a second frame member 40 and a corner key 60 that fits within the ends of each of the first frame member 20 and the second frame member 40. FIGS. 2 and 3 depict the corner joint 10 of FIG. 1 as assembled. As a result, the corner key 60 is not visible in FIGS. 2 and 3 because it is located within the first frame member 20 and second frame member 40.

In addition to providing structural support for the corner joint 10, the corner key 60 may also include features designed to control the flow of adhesive within the corner joint when the corner joint itself is assembled. It should, however, be understood that the corner key may, in some embodiments, be considered optional. In other words, the corner key 60 may not be required in all corner joints as described herein.

The illustrative corner joint 10 depicted in FIGS. 1-3 is the corner joint of a window sash is in, e.g., a casement window. As discussed herein, however, the corner joint constructions described herein can be used in any structure in which two frame members are to be connected at a corner where the appearance of a mortise and tenon joint is desired, e.g., other window sashes, doors, window frames, door frames, picture frames, etc. In the window sash corner joint 10 depicted in FIGS. 1-3, what is typically referred to as the interior surface of the corner joint is seen in FIG. 2, while the exterior surface of the corner joint is seen in FIG. 3. These descriptions are, however, provided only for reference purposes and the corner joints described herein may be used in an opposite manner, i.e., what may typically be considered an interior surface may be used as an exterior surface and vice versa.

The frame members used in the corner joints described herein may be manufactured by a variety of processes. It may, however, be preferred that the frame members be manufactured of an extruded material which may include fibers and a polymer, pultruded materials, etc. Examples of some potentially suitable constructions for frame members that may be used to construct corner joints as described herein may include those described in, e.g., U.S. Pat. No. 5,585,155 (Heikkila et al.); U.S. Pat. No. 6,106,944 (Heikkila et al.); U.S. Pat. No. 6,210,792 Seethamraju et al.); U.S. Pat. No. 6,260,251 (Guhl); U.S. Pat. No. 6,280,667 (Koenig et al.); U.S. Pat. No. 6,342,172 (Finley); etc.

Referring generally to FIGS. 1-3, the first frame member 20 includes a first corner end that faces the upwardly facing leg 64 of the corner key 60. The first corner end may include a first corner end opening into which the leg 64 of corner key 60 is inserted. The corner key end opening of the first frame member 20 is, in the depicted embodiment preferably provided by the open or hollow primary volume 22 formed within first frame member 20. In addition to the primary volume 22 formed within frame member 20, the frame member 20 also includes a secondary volume 28 which may be provided to improve structural integrity of the frame member in some constructions.

Although the end of the frame member 20 may preferably be hollow such that it forms an interior volume capable of receiving the leg 64 of the corner key 60, it should be understood that remainder of the frame member 20 may or may not be hollow. For example, in some embodiments, one or both of the volumes 22 and 28 may be solid and/or may be filled one or more materials such as foam, etc.

The first frame member 20 also preferably includes a first mitered surface 36 that is located between an inner squared flange 32 and the outer squared flange 34. The inner squared flange 32 preferably includes a free edge 33, while the outer squared flange 34 preferably includes a free edge 35. The first mitered surface 36 that is located between the inner squared flange 32 and the outer squared flange 34 is more completely illustrated and described in connection with FIGS. 4-6.

The first frame member 20 may also include features such as a channel 24 sized to receive a glazing panel (not shown) or other structure (e.g., a door panel, etc.). The use of structural members such as frame member 20 to hold structures such as, e.g., glazing panels, is known and will not be further described herein. Other features also depicted in connection with the first frame member 20 include channels 26 which are designed to receive weatherstripping materials to provide improved sealing when, for example, a window sash is closed within a frame.

Still another feature depicted in connection with the first frame member 20 is an injection port 30 that preferably extends through a wall of the frame member that forms a portion of the secondary volume 28 and, although not shown in FIG. 1, that also extends through the interior wall that forms secondary volume 28 such that the adhesive injection port 30 extends into the primary volume 22 of the frame member 20.

Although illustrative embodiments of the corner joints as described herein use the combination of a corner key and adhesive material to secure the corner joints, in some embodiments, the corner key alone may be used to secure the joint, while in other embodiments, the corner key may be used with one or more other fastening techniques, e.g., threaded fasteners (e.g., screws, etc.), pins, rivets, welding (thermal, ultrasonic, vibratory, and/or chemical), etc. to secure the corner joint.

In those embodiments of the corner joints described herein that are designed to be further secured with adhesive material in addition to a corner key, it may be preferred that, as assembled, the corner key 60 includes an adhesive orifice 70 that is aligned with the adhesive injection port 30 in the first frame member 20. The use of these features in connection with the injection of adhesives or other materials into the corner joint 10 to strengthen and secure the corner joint.

In some embodiments, the injection port 30 in an area of the frame member 20 where the injection port 30 extends through at least two walls of the frame member in which it is located. In the depicted embodiment, for example, the injection port extends through the two walls forming the secondary volume 28 within the first frame member 20.

Although the injection port 30 is provided in the first frame member 20, it should be understood that in other embodiments, the injection port could be provided in the second frame member 40. Furthermore, although one injection port is provided, in some embodiments, two or more injection ports may be provided.

The second frame member 40 as depicted in FIGS. 1-3 includes a second corner end that faces the leg 62 of the corner key 60. The second corner end of the second frame member 40 may also include a second corner end opening into which the leg 62 of the corner key 60 is inserted when the corner joint 10 is assembled. The second end opening of the second frame member 40 is, in the depicted embodiment, preferably provided by the primary volume 42 defining an interior volume formed within the second frame member 40.

In addition to the primary volume 42 formed within second frame member 40, the second frame member 40 also includes a secondary volume 48 which may be provided to improve structural integrity of the frame member in some constructions. Although the end of the second frame member 40 may preferably be hollow such that forms an interior volume capable of receiving the leg 62 of the corner key 60, it should be understood that the remainder of the frame member 40 may or may not be hollow as discussed above in connection with the first frame member.

The second frame member 40 includes a second mitered surface 56 that is located such that it faces the first mitered surface of the first frame member 20 when the first frame member 20 and the second frame member 40 are arranged to form the corner joint 10. The second corner end of the second frame member 40 also preferably includes an inner edge 53 that is spaced inwardly from the end of the second frame member 40 and that faces the free edge 33 of the inner squared flange 32. When the corner joint 10 is assembled, the free edge 33 and the inner edge 53 preferably form a joint that is aligned with the longitudinal axis 21 of the first frame member 20. It is that joint formed by the free edge 33 and the inner edge 53 that give the corner joint 10 the appearance of a mortise and tenon joint structure when viewed from the direction seen in FIG. 2.

The second frame member 40 also preferably includes a second corner and having an outer edge 55 that is spaced inwardly from the end of the second frame member 40 and that faces the free edge 35 of the outer squared flange 34 of the first frame member 20. When the corner joint 10 is assembled, the free edge 35 and the outer edge 55 of the second frame member 40 preferably form a joint that is aligned with the longitudinal axis 21 of the first frame member 20. It is that joint formed by the free edge 35 and the outer edge 55 that give the corner joint 10 the appearance of a mortise and tenon joint structure as described herein when viewed from the direction seen in FIG. 3.

The second frame member 40 also includes features such as a channel 44 sized to receive a glazing panel (not shown) or other structure (e.g., a door panel, etc.) as discussed above in connection with channel 24 in frame member 20. Other features also depicted in connection with the second frame member 40 include channels 46 which are designed to receive weatherstripping materials provide improved sealing when, for example, a window sash is closed.

Figure 4:
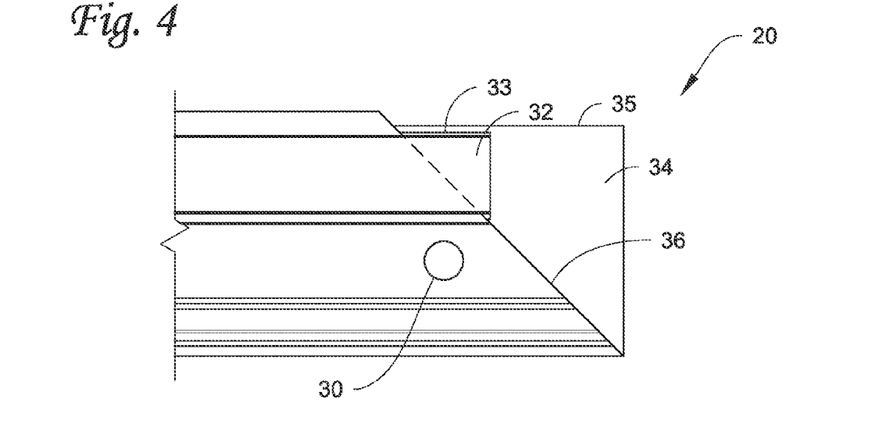
FIG. 4 is an interior side view of the first frame member used in the corner joint depicted in FIGS. 1-3.
Figure 5:
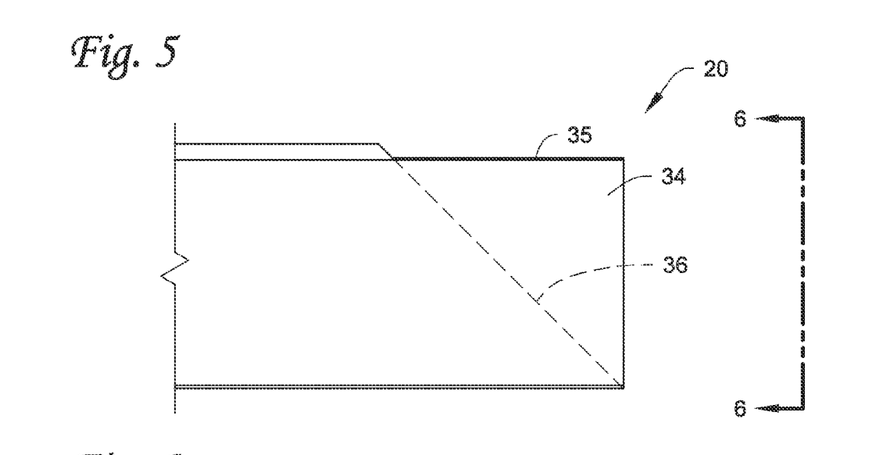
FIG. 5 is an exterior side view of the first frame member used in the corner joint depicted in FIGS. 1-3.
Figure 6:
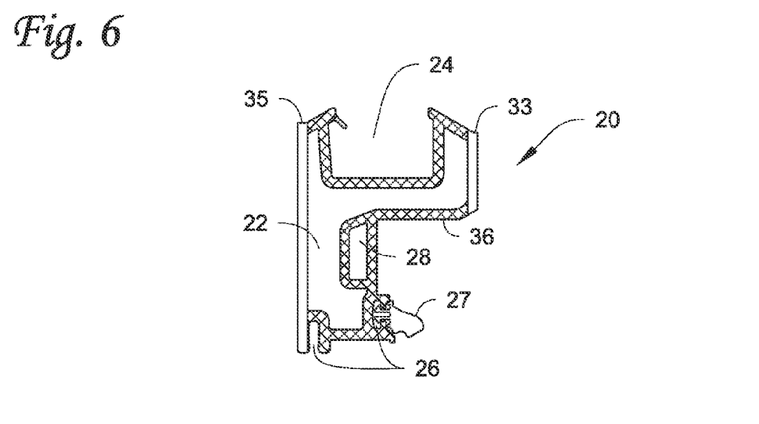
FIG. 6 is an end view of the first frame member of the corner joint of FIGS. 1-3 taken along the longitudinal axis defined by the first frame member.

Referring now to FIGS. 4-6, views of a portion of the first frame member 20 are seen including a first (typically an interior) side view in FIG. 4, an opposite (typically an exterior) side view in FIG. 5, and an end view in FIG. 6 (taken along the longitudinal axis 21 as seen in FIGS. 2 and 3). Among the features seen in FIG. 4 are the inner squared flange 32, the outer squared flange 34, and the first mitered surface 36. A large portion of the first mitered surface 36 is depicted by a broken line in FIG. 5 because a substantial portion of the first mitered surface 36 is hidden behind the squared outer flange 34 in that view. As seen in FIGS. 4-6, the first mitered surface 36 is located between the inner squared flange 32 and the outer squared flange 34. The first mitered surface 36 has been shaded in FIG. 6 to more accurately identify those portions of this view that constitute a part of the first mitered surface 36.

Among other features seen in FIGS. 4-6, are the free edge 33 of the inner squared flange 32 and the free edge 35 of the outer squared flange 34. Also seen in FIG. 6, are features such as the primary volume 22 formed within the frame member 20, as well as the secondary volume 28 also formed within the first frame member 20. Further, weatherstripping 27 is depicted in one of the channels 26 although any such weatherstripping is optional (the weatherstripping 27 is also depicted in FIG. 2).

Figure 7:
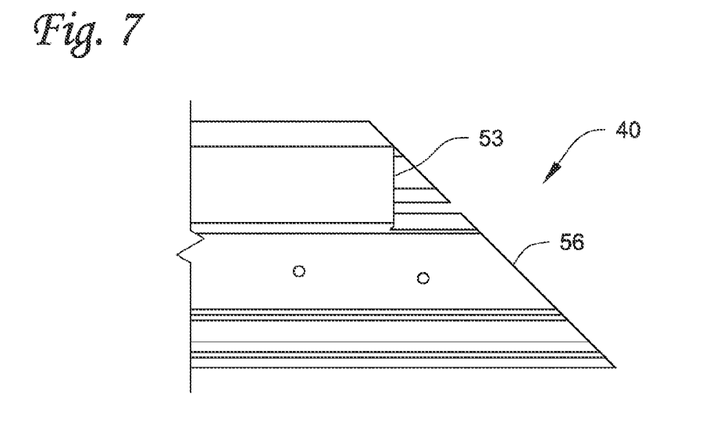
FIG. 7 is an interior side view of the second frame member used in the corner joint depicted in FIGS. 1-3.
Figure 8:
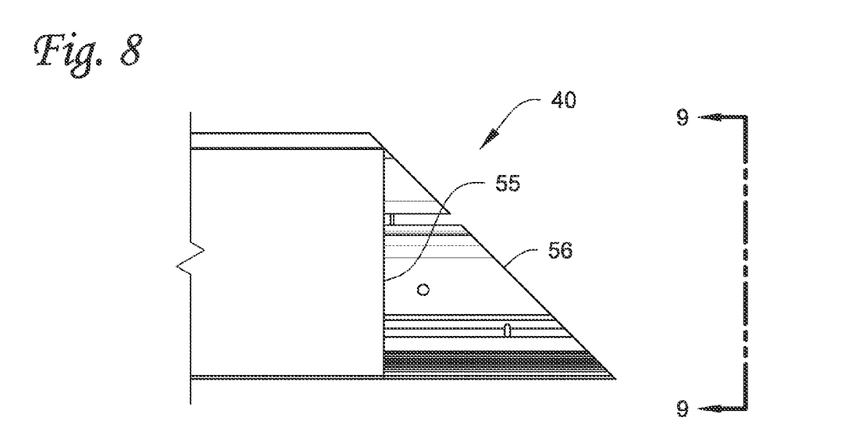
FIG. 8 is an exterior side view of the second frame member used in the corner joint depicted in FIGS. 1-3.
Figure 9:
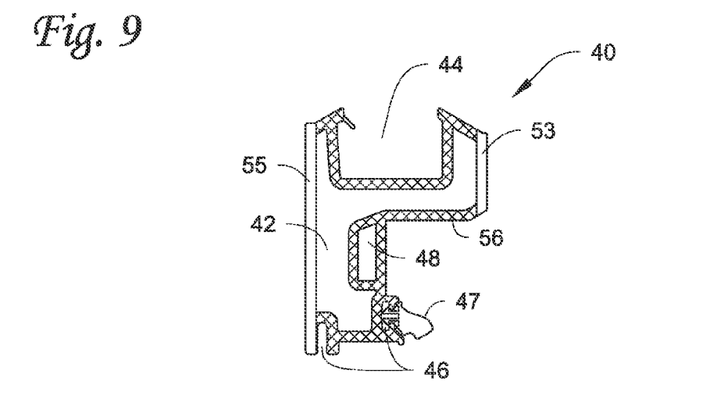
FIG. 9 is an end view of the second frame member of the corner joint of FIGS. 1-3 taken along the longitudinal axis defined by the second frame member.

Referring now to FIGS. 7-9, views of a portion of the second frame member 40 are seen including a first (typically an interior) side view in FIG. 7, a second (typically an exterior) side view in FIG. 8, and an end view in FIG. 9 (taken along the longitudinal axis 41 as seen in FIGS. 2 and 3). Among the features seen in FIG. 7 are the inner edge 53 that is spaced inwardly from the second mitered surface 56. As described herein, the inner edge 53 abuts the free edge 33 of the first frame member 20 when the inner squared flange 32 is positioned over a portion of the second frame member 40 in the corner joint 10 as assembled (see, e.g., FIG. 2).

Another feature seen in the view of FIG. 8 is the outer edge 55 that is spaced inwardly from the second mitered surface 56 on the depicted side of second frame member 40. As described herein, the outer edge 55 abuts the free edge 35 of the outer squared flange 34 when the outer squared flange 34 is positioned over a portion of the second frame member 40 in the corner joint 10 as assembled (see, e.g., FIG. 3).

The second mitered surface 56 on the second frame member 40 preferably faces the first mitered surface 36 when the first frame member 20 and the second frame member 40 are assembled to form a corner joint as seen in, e.g., FIGS. 2-3. The second mitered surface 56 has been shaded in the end view of FIG. 9 to more clearly indicate which surfaces of second frame member 40 are mitered in the end view of FIG. 9.

Although the corner joints described herein include edges that meet in a way that is designed to give the joint the appearance of a mortise and tenon structure, a mitered portion of the joint formed by the first mitered surface 36 and the second mitered surface 56 can be seen in the assembled corner joint 10 as depicted in FIG. 2. That portion of the mitered joint formed within the corner joint 10 is, however, not typically visible unless the corner joint 10 is, e.g., part of a window sash that has been opened. As a result, the injection port 30, which may be sealed with a plug, sealant, etc. after adhesive has been injected into the corner joint 10 without disturbing the mortise and tenon appearance of the corner joint 10 as described herein.

Among other features seen in FIGS. 7-9 are the primary volume 42 formed within the first frame member 40, as well as the secondary volume 48 also formed within the second frame member 40. Further, weatherstripping 47 is depicted in one of the channels 46, although any such weatherstripping is, of course, optional (the weatherstripping 47 is also depicted in FIG. 2).

As described herein, the corner joints manufactured using a corner key to connect first and second frame members may be further reinforced by the addition of adhesive materials that may be injected into the corner joint. In the illustrative embodiment depicted in FIGS. 1-9, the first frame member 20 includes an optional adhesive injection port 30 that extends through the first frame member into the primary interior volume 22 of the first frame member 20 as described herein. In other embodiments, however, it should be understood that the adhesive material may be provided within the corner joints described herein prior to or during assembly of the first and second frame member and associated corner key such that an injection port may or may not be required provide any such adhesive material. In those embodiments in which adhesive material is injected into the corner joint, it may be advantageous to clamp or otherwise apply pressure to the frame members to facilitate the proper distribution of adhesive material within the corner joints and/or to reduce or eliminate any leakage of the adhesive material onto visible surfaces of the corner joints.

Regardless of how the adhesive material used within the corner joints described herein is delivered to the interior of the corner joint, it may be preferred that the adhesive be located between the corner key 60 and a sufficient amount (in both number and surface area) of the inner surfaces of the frame members so that a structurally sound corner joint can be provided. In some embodiments, the adhesive may preferably be located between the inner squared flange and the corner key as well as the outer squared flange in the corner key so that flanges can be securely attached to the remainder of the corner joint. In some embodiments, inner surfaces of the outer squared flange and the inner squared flange may be adhesively attached to the second frame member in addition to the corner (in those embodiments that include a corner key) or to the second frame member alone in those embodiments that do not include a corner key.

The "adhesive materials" that can be used to strengthen the corner joints in combination with corner keys as described herein may include, but are not limited to, material such as hot melt adhesives (thermoplastic, thermoset, etc.), epoxies, silicones, thermoplastic polymers, thermoset polymers, adhesive tapes, pressure sensitive adhesives, pressure-activated adhesives, etc. In some embodiments, the "adhesive materials" may not be considered as "adhesive" in the conventional sense, but may, when located within the corner joint with a corner key, further strengthen the corner joint by, e.g., increasing the frictional connection between the components in the joint, forming a mechanically interlocking structure within the corner joint, etc.

Figure 10A:
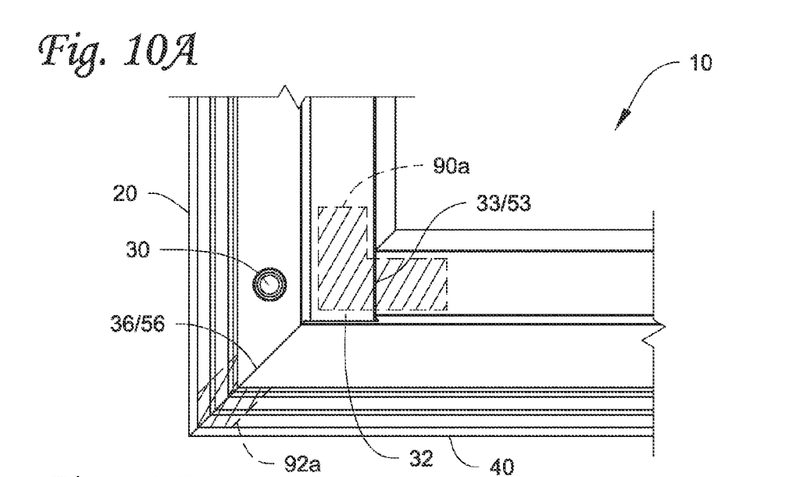
FIG. 10A is an interior side view of the corner joint of FIG. 1 as assembled depicting the location of adhesive within the corner joint.

FIGS. 10A-10F are views of an assembled corner joint 10 that include shaded areas which correspond generally to areas in which adhesive may preferably be located between a corner key and the frame members and from which the corner joint 10 is constructed. FIG. 10A depicts an interior side view of the corner joint 10 as assembled with the adhesive located in area 90a underneath the inner squared flange 33, as well as other portions of the first frame member 20 and the second frame member 40 adjoining the inner squared flange 33. A second area 92a of adhesive may also preferably be located towards the outside corner of the corner joint 10 along the juncture of the first mitered surface 36 and the second mitered surface 56.

Figure 10B:
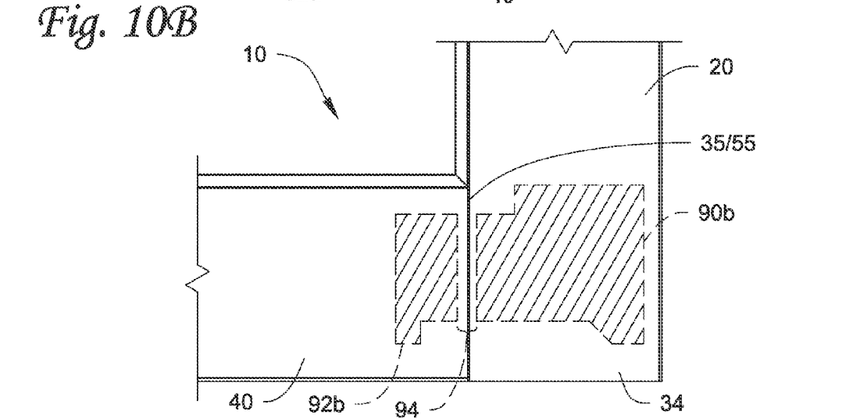
FIG. 10B is a right side view of the corner joint of FIG. 10A depicting the location of adhesive within the corner joint.

In the view depicted in FIG. 10B, an area 90b of adhesive is located between the first outer squared flange 34 of the frame member 20 and the corner key and a second area 92b of adhesive is located between the second frame member 40 and the corner key. From this perspective, the corner joint 10 includes a juncture between the free edge 35 of the outer squared flange 34 and the outer edge 55 of the second frame member 40. To reduce the likelihood of leakage of adhesive material through the interface between the free edge 35 and the outer edge 55, it may be desirable to restrict or limit the flow of any adhesive to the area directly underneath the interface between the free edge 35 and outer edge 55. In some embodiments (as will be described herein), the corner key 60 may include a dam that is positioned beneath the free edge 35 of the outer squared flange 34 when the corner joint is assembled. The dam may occupy a zone between two adjacent adhesive areas 90b and 92b as denoted by reference number 94 in FIG. 10B.

Figure 10C:
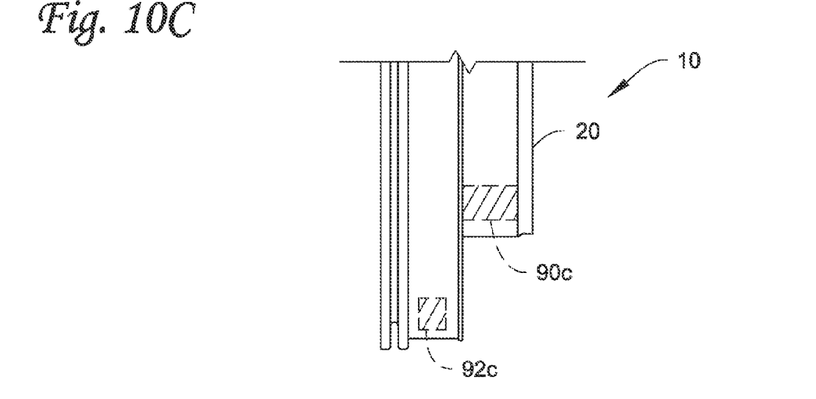
FIG. 10C is an exterior side view of the corner joint of FIG. 10A depicting the location of adhesive within the corner joint.

FIG. 10C is an exterior side view of the corner joint 10 taken from the right side of the corner joint 10 as depicted in FIG. 10B. As a result, only surfaces of the first frame member 20 are seen in FIG. 10C. Adhesive is located in two areas 90c and 92c between the first frame member 20 and the corner key located within the corner joint 10 when viewed from this angle.

Figure 10D:
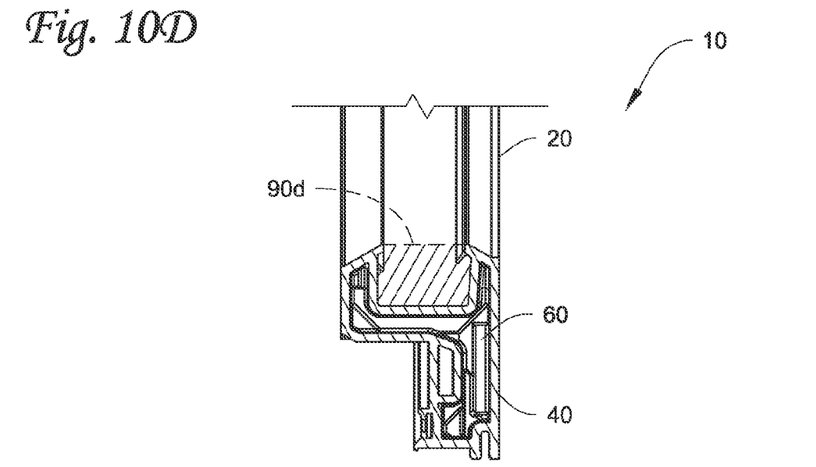
FIG. 10D is a left side view of the corner joint of FIG. 10A depicting the location of adhesive within the corner joint.

FIG. 10D is a left side view of the corner joint 10 taken from the left side of the corner joint 10 as depicted in FIG. 10B. When viewed from this angle, an area 90d of adhesive is primarily located between the first frame member 20 and the corner key 60 located within the corner joint 10 (with a portion of the corner key 60 being located within the interior volume of the second frame member 40).

Figure 10E:
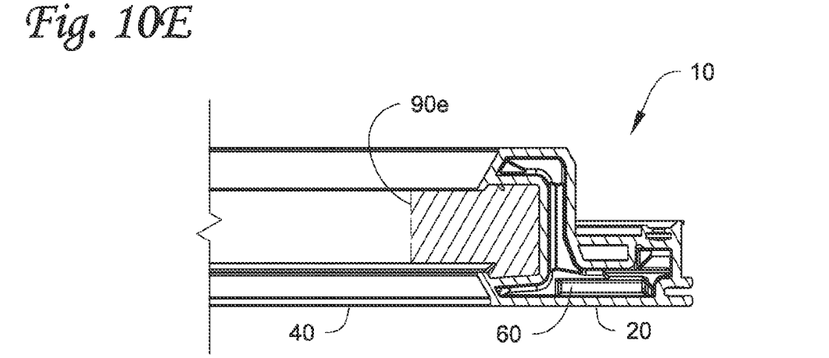
FIG. 10E is a top view of the corner joint of FIG. 10A depicting the location of adhesive within the corner joint.

FIG. 10E is a top view of the corner joint 10 as seen in FIG. 10B. When viewed from this angle, an area 90e of adhesive is located between the corner key 60 and the second frame member 40 (with a portion of the corner key 60 being located within the interior volume of the first frame member 20).

Figure 10F:
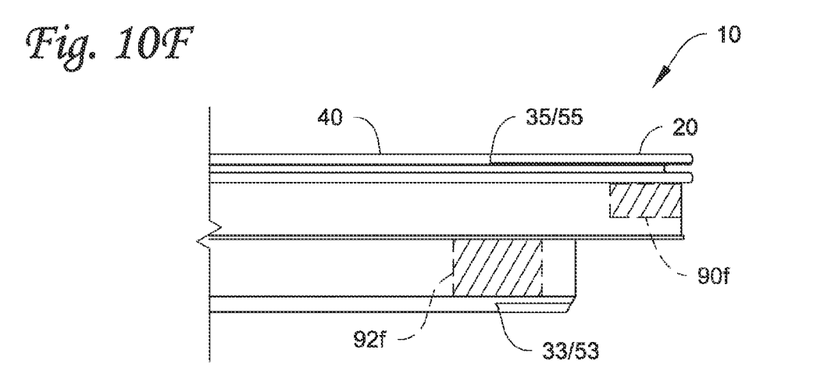
FIG. 10F is a bottom view of the corner joint of FIG. 10A depicting the location of adhesive within the corner joint.

FIG. 10F is a bottom view of the corner joint taken from the bottom of the view seen in FIG. 10B. As a result, only surfaces of the second frame member 40 are seen in FIG. 10F. Adhesive is located in between the second frame member 40 and the corner key in two areas 90f and 92f within the corner joint when viewed from this angle.

Taken together, it can be seen from the views depicted in FIGS. 10A-10F that it may be desirable to distribute adhesive to a variety of interfaces between the corner key 60 and the frame members 20 and 40 that make up corner joint 10. It should, however, be understood that corner joints as described herein, may or may not include adhesive distributed along all of the surfaces depicted in connection with this illustrative embodiment. In some embodiments, less adhesive may be needed to provide a corner joint with sufficient structural integrity and, in other embodiments, less adhesive may be needed.

Figure 11A:
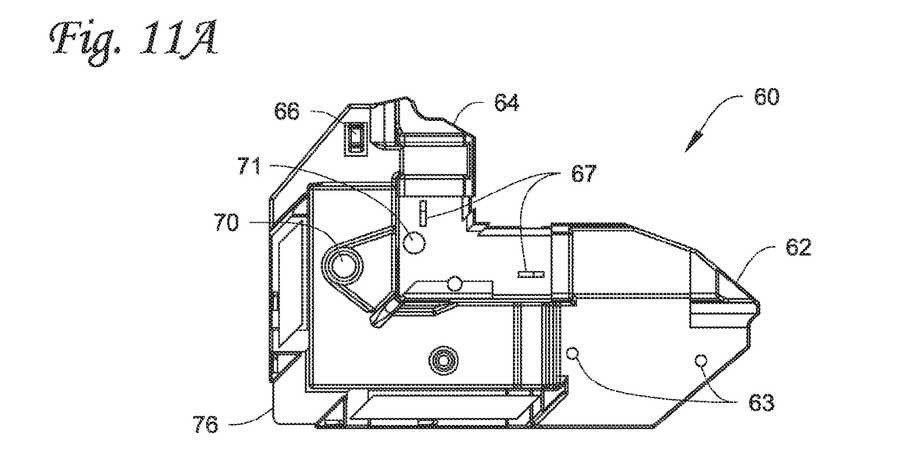
FIG. 11A is a an interior side view of one embodiment of a corner key used in a corner joint as described herein.

FIGS. 11A-11F are views of one embodiment of a corner key that may be used in the corner joints described herein. FIG. 11A is an interior side view of the corner key 60 including legs 62 and 64 (see, e.g., the exploded view of FIG. 1). Among the features depicted in connection with the corner key 60 are the adhesive orifice 70 which, as described herein, preferably aligns with the adhesive injection port 30 in the first frame member 20.

The corner key 60 also includes an optional spacer element 66, as well as standoff elements 67. The spacer element 66 may be provided to assist with retention of the leg 64 of the corner key 60 in a frame member. For example, as leg 64 of corner key 60 is inserted into the hollow end of a frame member, the corner key 60 may preferably be (at least partially) retained within the frame member by friction forces generated between the spacer element 66 and the interior of the frame member in which leg 64 is located. In some embodiments, the spacer element 66 may also be aligned with the adhesive injection port 30 (where such an adhesive injection port is provided) to interact with the adhesive injection port to further assist retention of the corner key 60 within the frame member.

The standoff elements 67 may be provided in areas in which adhesive is distributed between the key 60 and the frame members during the manufacturing process to ensure that a sufficient volume of adhesive is provided between the corner key 60 and the portions of the frame member into which the corner key 60 is inserted to provide an acceptable bond between the corner key 60 and the frame member.

Other optional features of the illustrative embodiment of the corner key 60 depicted in FIG. 11A include openings 63 that may preferably be aligned with hardware that may be attached to a window sash (or other structure) in which the corner key 60 is located. The openings 63 may be positioned to receive a screw or other fastener used to attach hardware to the structure in which the corner key 60 is located. Mechanical attachment of the corner key 60 to such hardware may, in some embodiments, further strengthen a corner joint manufactured using the corner key 60 and/or strengthen the connection between the hardware and the frame member.

Figure 11B:
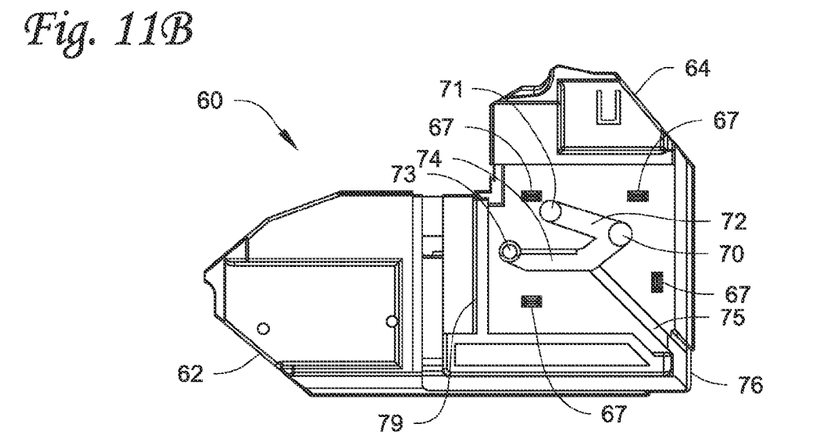
FIG. 11B is a right side view of the corner key of FIG. 11A.

FIG. 11B is an exterior side view of the corner key 60 of FIG. 11A. As seen in the view of FIG. 11B, the corner key 60 includes a leg 62 and a leg 64, as well as standoff elements 67 all of which are described above. In addition, the view of corner key 60 as seen in FIG. 11B illustrates the connection of adhesive orifice 70 with a variety of distribution features used to distribute adhesive material to the various surfaces of the corner key 60 so that a corner joint with sufficient structural integrity can be provided.

Among the adhesive distribution features seen in FIG. 11B are channels 72 and 74 which are used to distribute adhesive passing through adhesive orifice 70 to vias 71 and 73, respectively. In other words, as adhesive is injected through the adhesive orifice 70 it may preferably flow through channels 72 and 74 to vias 71 and 73, where the adhesive may be further distributed to other areas within the corner joint 10. For example, via 71 is also seen in FIG. 11A and is used to distribute adhesive to the area 90d of adhesive between the corner key 60 and frame member 20 as seen in FIG. 10D. Via 73 is used to distribute adhesive to the area 90e of adhesive between the corner key 60 and frame member 40 as depicted in FIG. 10E.

Other adhesive distribution features seen on the corner key 60 in the view of FIG. 11B include a channel 75 that leads to the outside corner 76 of the corner key 60. As a result, adhesive traveling through channel 75 may be distributed to lowermost area 92c of adhesive between the corner key 60 and frame member 20 as depicted in FIG. 10 C and to the area 90f of adhesive located on the right edge of the frame member 20 as depicted in 10F (which correspond to the outside corner of the corner joint).

Yet another adhesive distribution feature depicted in the corner key 60 in the view seen in FIG. 11B is a dam 79 that is preferably positioned beneath the free edge 35 of the outer square flange 34 and the corresponding outer edge 55 formed on the second frame member 40 as described herein. The dam 79 preferably prevents or restricts adhesive from flowing beneath the interface between the free edge 35 and the outer edge 55. As a result, leakage of the adhesive through that interface may be reduced or, preferably, eliminated.

Figure 11C:
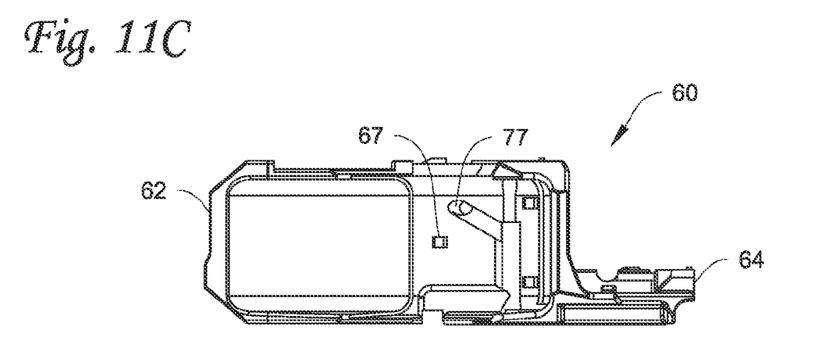
FIG. 11C is an exterior side view of the corner key of FIG. 11A.

Referring to the view of corner key 60 as seen in FIG. 11C (which is a top view of the corner key 60 as seen in FIG. 11B), the corner key 60 includes leg 62 and leg 64, along with standoff element 67. Also seen in the view of FIG. 11C is a via 77 used to assist in the delivery of adhesive to area 92f of adhesive as depicted in FIG. 10F.

Figure 11D:
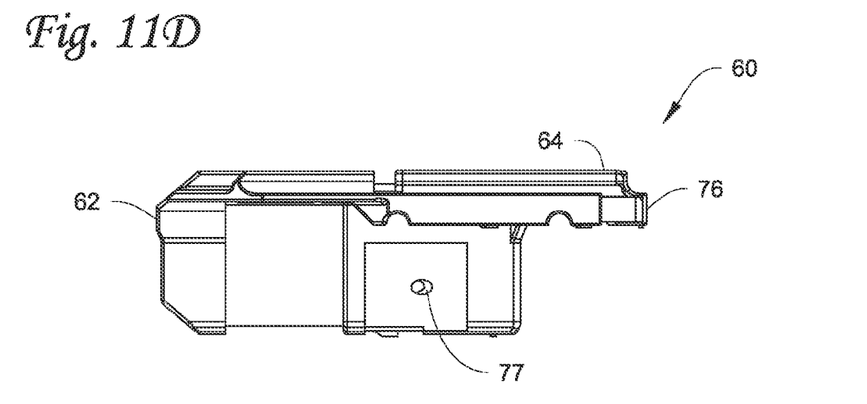
FIG. 11D is a left side view of the corner key of FIG. 11A.

Referring to the view of corner key 60 as seen in FIG. 11D (which is a bottom view of the corner key 60 as seen in FIG. 11B), the corner key 60 includes leg 62 and leg 64, as well as via 77 through which adhesive flows to the rectangular area surrounding via 77.

Figure 11E:
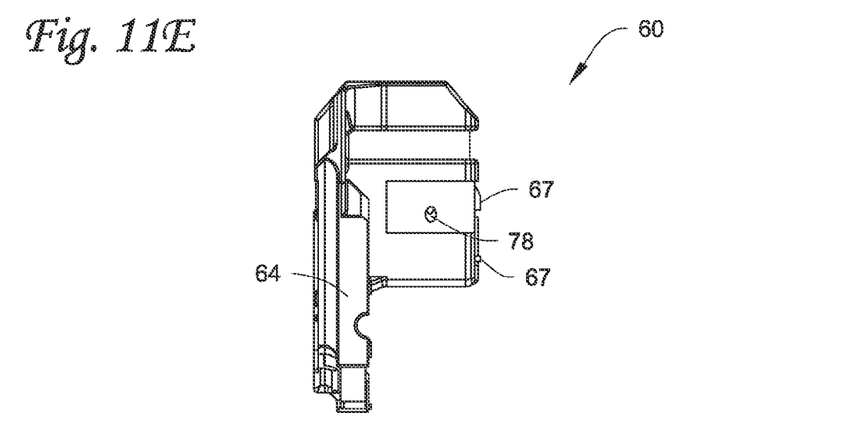
FIG. 11E is a top view of the corner key of FIG. 11A.

Referring to the view of corner key 60 as seen in FIG. 11E (which is a view taken from the right of the corner key 60 as seen in FIG. 11B), a via 78 is provided in the rectangular area that is associated with the area 90c of adhesive as seen in FIG. 10C. Also seen in the view of FIG. 11E are standoff elements 67.

Figure 11F:
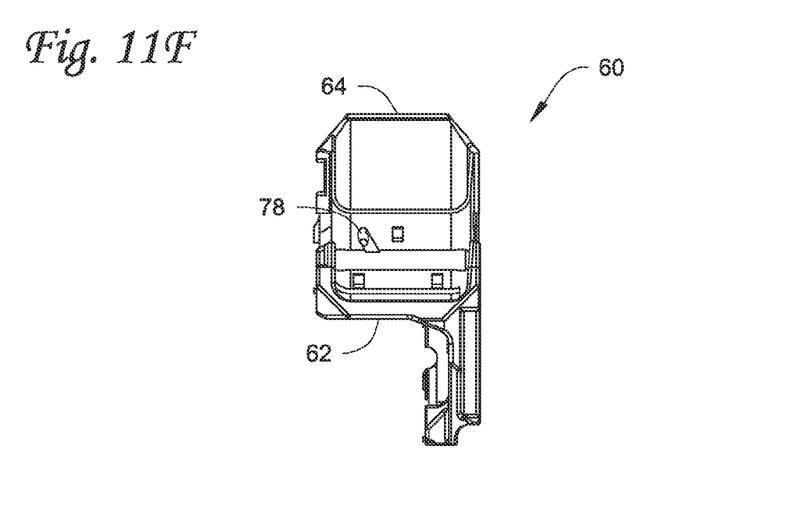
FIG. 11F is a bottom view of the corner key of FIG. 11A.

Referring to the view of corner key 60 as seen in FIG. 11F (which is a left side view of the corner key 60 as seen in FIG. 11B), the via 78 described above in connection with FIG. 11E is seen within the corner key 60 and it is through this via that adhesive is delivered to the rectangular area depicted in FIG. 11E and in which via 78 is located.

The corner key 60 depicted and described in connection with FIGS. 11A-11F is only one embodiment of a multitude of different embodiments of corner keys that could be used to construct corner joints as described herein. The specifics with respect to distribution of adhesive throughout the various surfaces of the corner key may be varied as needed depending on a variety of factors including the size of the corner key and the frame members, the properties of the adhesive being delivered (e.g., the viscosity, tackiness, density, curing and/or hardening properties, and other characteristics of the adhesives). As a result, it should be understood that many different embodiments of corner keys could be used to construct corner joints according to the principles described herein.

Figure 12A:
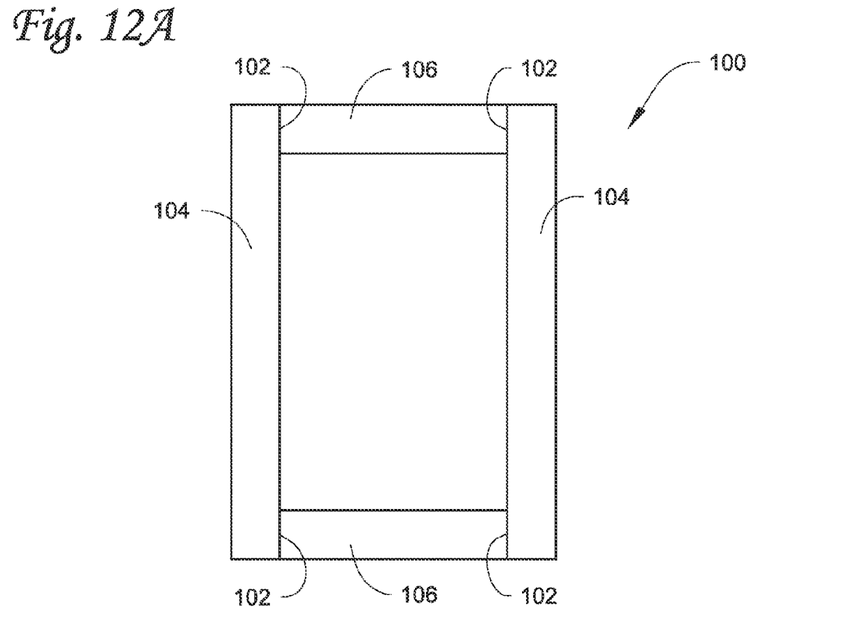
FIG. 12A is a view of one surface of a structure in the form of a window sash that includes four corner joints as described herein.
Figure 12B:
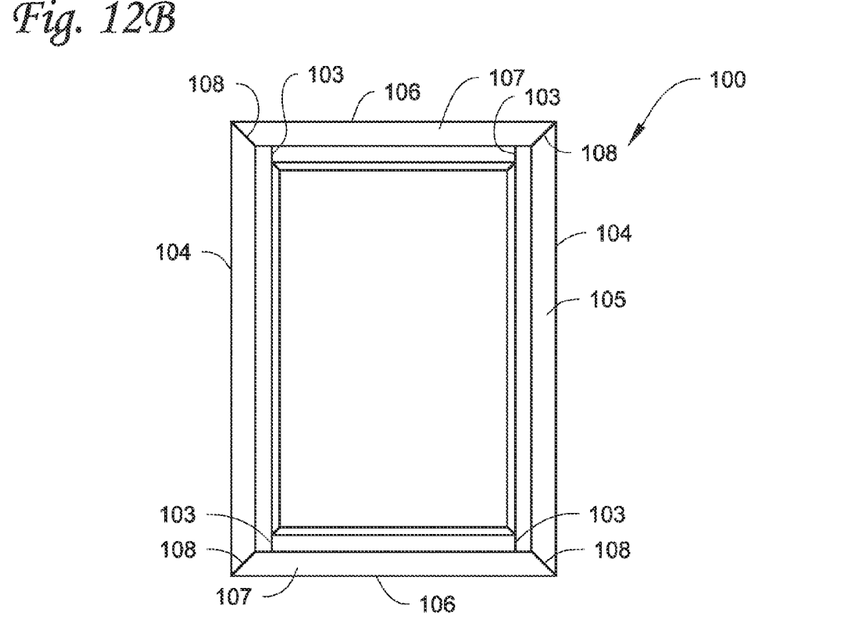
FIG. 12B is a view of the opposite surface of the window sash of FIG. 12A.

FIGS. 12A and 12B are provided to illustrate one example of structure that could be constructed with the appearance of mortise and tenon joints as described herein. In this depicted embodiment, the structure 100 may be in the form of a window sash, although, as described above, the corner joints described herein may be used in any structure in which two frame members are to be connected at a corner where the appearance of a mortise and tenon joint is desired, e.g., doors, window frames, door frames, picture frames, etc. Any of these structures may be used in exterior and/or interior applications. Although the structure 100 depicted in FIGS. 12A and 12B has a different appearance on its opposing sides, in some embodiments the structure may have the same appearance on both sides. For example, in some embodiments, both sides of the structure may have the appearance depicted in FIG. 12A, while in other embodiments both sides of the structure may have the appearance depicted in FIG. 12B.

The sash 100 depicted in FIG. 12A includes a pair of vertical frame members 104 and a pair of horizontal frame members 106. At each of the four corners in the sash 100, a visible joint 102 is provided and is oriented along the longitudinal axis of one of the frame members to provide the appearance of a mortise and tenon joint structure as described herein. In many embodiments, the surfaces seen in the sash 100 as depicted in FIG. 12A would be found on the exterior of a window sash, although it should be understood that these features could be reversed in certain situations (i.e., they could be found on an interior surface).

Referring to FIG. 12B, an opposing side or surface of the sash 100 seen in FIG. 12A which would typically correspond to the interior of a window sash is depicted. As discussed herein, however, the sash 100 may be in the form of a casement window sash that includes an inset edge 105 along the vertical frame members 104 and an inset edge 107 along the horizontal frame members 106. The inset edges would typically not be visible when the sash 100 is closed within a window frame in which the sash 100 is mounted.

Again, the frame members 104 and 106 are arranged and form corner joints each of which include a visible joint 103 that is oriented along the longitudinal axis of one of the frame members to provide the appearance of a mortise and tenon joint structure as described herein. Further, as seen and described in connection with FIG. 2, portions of the sash 100 as seen in FIG. 12B may include a mitered joint 108 that forms a 45° angle at the corner with both of the frame members 104 and 106. These mitered joints 108 are, however, preferably limited to the junctions between the inset edges 105 and 107 and are, therefore, not typically visible unless the window sash is open within its window frame. In other words, when the window sash is closed, only the joint structure 103 corresponding to a mortise and tenon joint structure would typically be visible.

The complete disclosure of any patents, patent documents, and publications identified herein are incorporated by reference in their entirety as if each were individually incorporated.

Illustrative embodiments of the corner joints and methods of making them are discussed and reference has been made to possible variations. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A corner joint comprising:
a first frame member defining a longitudinal axis and comprising a first corner end, wherein the first corner end comprises a first mitered surface located between an inner squared flange and an outer squared flange, wherein the inner squared flange defines a first plane on one side of the first frame member and the outer squared flange defines a second plane on an opposite side of the first frame member, wherein the first plane and the second plane are parallel to each other, and wherein the inner squared flange comprises a free edge aligned with the longitudinal axis of the first frame member and wherein the outer squared flange comprises a free edge aligned with the longitudinal axis of the first frame member;
a second frame member defining a longitudinal axis and comprising a second corner end, wherein the second corner end comprises a second mitered surface, an inner edge spaced longitudinally inwardly from the second mitered surface, and an outer edge spaced longitudinally inwardly from the second mitered surface, wherein the inner edge and the outer edge are oriented perpendicular to the longitudinal axis of the second frame member;
wherein the first mitered surface faces the second mitered surface between the inner squared flange and the outer squared flange of the first frame member, wherein the first mitered surface and the second mitered surface define a miter joint plane that forms an acute angle with the longitudinal axis of the first frame member and an acute angle with the longitudinal axis of the second frame member, and wherein the inner squared flange obscures less of the first and second mitered surfaces when the corner joint is viewed from the side of the corner joint on which the inner flange is located than the outer flange obscures when the corner joint is viewed from the side of the corner joint on which the outer flange is located,
wherein the free edge of the inner squared flange on the first frame member faces and is aligned with the inner edge of the second frame member to form an inner joint aligned with the longitudinal axis of the first frame member,
wherein the free edge of the outer squared flange on the first frame member faces and is aligned with the outer edge of the second frame member to form an outer joint aligned with the longitudinal axis of the first frame member.

2. A corner joint according to claim 1, wherein the first frame member comprises a first corner end opening, wherein the second frame member comprises a second corner end opening, and wherein the corner joint further comprises a corner key comprising a first leg and a second leg, wherein the first leg is located in the first corner end opening and the second leg is located in the second corner end opening.

3. A corner joint according to claim 2, wherein the corner joint comprises adhesive material located between the inner squared flange and the corner key and adhesive material located between the outer squared flange and the corner key.

4. A corner joint according to claim 1, wherein the corner joint comprises an adhesive injection port aligned with an adhesive orifice formed through a corner key located within the corner joint, wherein adhesive material introduced into the corner joint through the adhesive injection port passes through the adhesive orifice before being distributed in the corner joint.

5. A corner joint according to claim 4, wherein the corner key comprises a via connected to the adhesive orifice by a channel formed in a first surface of the corner key, wherein adhesive material passing through the adhesive orifice flows into the channel and through the via to a second surface of the corner key.

6. A corner joint according to claim 1, wherein an inner surface of the outer squared flange is adhesively attached to the second frame member.

7. A corner joint according to claim 1, wherein an inner surface of the inner squared flange is adhesively attached to the second frame member.

8. A corner joint according to claim 1, wherein an inner surface of the outer squared flange is adhesively attached to a corner key located within the corner joint, and wherein the corner key comprises a dam positioned beneath the free edge of the outer squared flange such that adhesive is not located between the free edge of the outer squared flange and the corner key.

9. A corner joint according to claim 1, wherein an inner surface of the outer squared flange is adhesively attached to the second frame member and an inner surface of the inner squared flange is adhesively attached to the second frame member.

10. A corner joint comprising:
a first frame member defining a longitudinal axis and comprising a first corner end that comprises a first corner end opening, wherein the first corner end further comprises a first mitered surface located between an inner squared flange and an outer squared flange, wherein the inner squared flange defines a first plane on one side of the first frame member and the outer squared flange defines a second plane on an opposite side of the first frame member, wherein the first plane and the second plane are parallel to each other;
a second frame member defining a longitudinal axis and comprising a second corner end that comprises a second corner end opening, wherein the second corner end further comprises a second mitered surface, an inner edge spaced longitudinally inwardly from the second mitered surface, and an outer edge spaced longitudinally inwardly from the second mitered surface, wherein the inner edge and the outer edge are oriented perpendicular to the longitudinal axis of the second frame member;
a corner key comprising a first leg and a second leg, wherein the first leg is located in the first corner end opening and the second leg is located in the second corner end opening; and
adhesive material located between the inner squared flange and the corner key and adhesive material located between the outer squared flange and the corner key; wherein the first mitered surface faces the second mitered surface between the inner squared flange and the outer squared flange of the first frame member, wherein the first mitered surface and the second mitered surface define a miter joint plane that forms an acute angle with the longitudinal axis of the first frame member and an acute angle with the longitudinal axis of the second frame member, and wherein the inner squared flange obscures less of the first and second mitered surfaces when the corner joint is viewed from the side of the corner joint on which the inner flange is located than the outer flange obscures when the corner joint is viewed from the side of the corner joint on which the outer flange is located;
wherein a free edge of the inner squared flange on the first frame member is aligned with the longitudinal axis of the first frame member and faces and is aligned with the inner edge of the second frame member, and wherein the free edge of the inner squared flange on the first frame member and the inner edge of the second frame form an inner joint aligned with the longitudinal axis of the first frame member,
wherein a free edge of the outer squared flange on the first frame member is aligned with the longitudinal axis of the first frame member and faces and is aligned with the outer edge of the second frame member, and wherein the free edge of the outer squared flange on the first frame member and the outer edge of the second frame form an outer joint aligned with the longitudinal axis of the first frame member.

11. A corner joint according to claim 10, wherein the corner key comprises a via connected to the adhesive orifice by a channel formed in a first surface of the corner key, wherein adhesive material passing through the adhesive orifice flows into the channel and through the via to a second surface of the corner key.

12. A corner joint according to claim 10, wherein an inner surface of the outer squared flange is adhesively attached to the second frame member and an inner surface of the inner squared flange is adhesively attached to the second frame member.

13. A corner joint according to claim 10, wherein an inner surface of the outer squared flange is adhesively attached to a corner key located within the corner joint, and wherein the corner key comprises a dam positioned beneath the free edge of the outer squared flange such that adhesive is not located between the free edge of the outer squared flange and the corner key.

14. A method of forming a corner joint, the method comprising:
forming a first mitered surface on a first corner end of a first frame member defining a longitudinal axis, wherein the first mitered surface is located between an inner squared flange and an outer squared flange at the first corner end of the first frame member, wherein the inner squared flange defines a first plane on one side of the first frame member and the outer squared flange defines a second plane on an opposite side of the first frame member, wherein the first plane and the second plane are parallel to each other, and wherein the inner squared flange comprises a free edge aligned with the longitudinal axis of the first frame member and the outer squared flange comprises a free edge aligned with the longitudinal axis of the first frame member;
forming a second mitered surface on a second corner end of a second frame member defining a longitudinal axis;
forming an inner edge on the second frame member that is spaced longitudinally inwardly from the second mitered surface and an outer edge on the second frame member that is spaced longitudinally inwardly from the second mitered surface, wherein the inner edge and the outer edge are oriented perpendicular to the longitudinal axis of the second frame member, and wherein the second mitered surface is located between the inner edge and the outer edge;
attaching the first frame member to the second frame member such that the first mitered surface of the first frame member and the second mitered surface of the second frame member face each other between the inner squared flange and the outer squared flange of the first frame member within the corner joint, wherein the first mitered surface and the second mitered surface define a miter joint plane that forms an acute angle with the longitudinal axis of the first frame member and an acute angle with the longitudinal axis of the second frame member, wherein the inner squared flange obscures less of the first and second mitered surfaces when the corner joint is viewed from the side of the corner joint on which the inner flange is located than the outer flange obscures when the corner joint is viewed from the side of the corner joint on which the outer flange is located, the free edge of the inner squared flange on the first frame member abuts and is aligned with the inner edge of the second frame member to form an inner joint aligned with the longitudinal axis of the first frame member, and the free edge of the outer squared flange on the first frame member abuts and is aligned with the outer edge of the second frame member to form an outer joint aligned with the longitudinal axis of the first frame member.

15. A method according to claim 14, further comprising positioning a first leg of a corner key in a first corner opening of a first corner end of the first frame member and positioning a second leg of the corner key in a second corner opening of a second corner end of the second frame member.

16. A method according to claim 15, wherein the method further comprises providing adhesive material between the inner squared flange and the corner key and between the outer squared flange and the corner key.

17. A method according to claim 14, wherein the method further comprises injecting adhesive material into the corner joint through an adhesive injection port aligned with an adhesive orifice formed through a corner key located within the corner joint, wherein the adhesive material injected through the adhesive injection port passes through the adhesive orifice before being distributed in the corner joint.

18. A method according to claim 17, wherein the corner key comprises a via connected to the adhesive orifice by a channel formed in a first surface of the corner key, wherein the adhesive material injected through the adhesive orifice flows into the channel and through the via to a second surface of the corner key.

19. A method according to claim 14, wherein an inner surface of the outer squared flange is adhesively attached to the second frame member.

20. A method according to claim 14, wherein an inner surface of the inner squared flange is adhesively attached to the second frame member.

21. A method according to claim 14, wherein an inner surface of the outer squared flange is adhesively attached to a corner key located within the corner joint, and wherein the corner key comprises a dam positioned beneath the free edge of the outer squared flange such that adhesive material does not flow between the free edge of the outer squared flange and the corner key.

22. A structure comprising a first frame member defining a longitudinal axis and a second frame member defining a longitudinal axis attached to each other at a corner joint, wherein the corner joint comprises:
 a first mitered surface located between an inner squared flange and an outer squared flange on a first corner end of the first frame member, wherein the inner squared flange defines a first plane on one side of the first frame member and the outer squared flange defines a second plane on an opposite side of the first frame member, wherein the first plane and the second plane are parallel to each other;
 a second mitered surface located on a second corner end of the second frame member, an inner edge spaced longitudinally inwardly from the second mitered surface on the second corner end of the second frame member, and an outer edge spaced longitudinally inwardly from the second mitered surface on the second corner end of the second frame member, wherein the inner edge and the outer edge are oriented perpendicular to the longitudinal axis of the second frame member;
 wherein the first mitered surface faces the second mitered surface between the inner squared flange and the outer squared flange of the first frame member, wherein the first mitered surface and the second mitered surface define a miter joint plane that forms an acute angle with the longitudinal axis of the first frame member and an acute angle with the longitudinal axis of the second frame member, and wherein the inner squared flange obscures less of the first and second mitered surfaces when the corner joint is viewed from the side of the corner joint on which the inner flange is located than the outer flange obscures when the corner joint is viewed from the side of the corner joint on which the outer flange is located;
 wherein a free edge of the inner squared flange on the first frame member is aligned with the longitudinal axis of the first frame member and faces and is aligned with the inner edge of the second frame member, and wherein the free edge of the inner squared flange on the first frame member and the inner edge of the second frame form an inner joint aligned with the longitudinal axis of the first frame member,
 wherein a free edge of the outer squared flange on the first frame member is aligned with the longitudinal axis of the first frame member and faces and is aligned with the outer edge of the second frame member, and wherein the free edge of the outer squared flange on the first frame member and the outer edge of the second frame form an outer joint aligned with the longitudinal axis of the first frame member.

23. A structure according to claim 22, wherein the structure is selected from the group consisting of a window sash, window frame, door, door frame, and picture frame.

24. A structure according to claim 22, wherein the first frame member comprises a first corner end opening, wherein the second frame member comprises a second corner end opening, and wherein the corner joint further comprises a corner key comprising a first leg and a second leg, wherein the first leg is located in the first corner end opening and the second leg is located in the second corner end opening;
 wherein the corner joint comprises adhesive material located between the inner squared flange and the corner key and adhesive material located between the outer squared flange and the corner key;
 wherein the corner joint comprises an adhesive injection port aligned with an adhesive orifice formed through a corner key located within the corner joint, wherein adhesive material introduced into the corner joint through the adhesive injection port passes through the adhesive orifice before being distributed in the corner joint;
 and wherein the corner key comprises a via connected to the adhesive orifice by a channel formed in a first surface of the corner key, wherein adhesive material passing through the adhesive orifice flows into the channel and through the via to a second surface of the corner key.

* * * * *